(12) United States Patent
Constant, Jr.

(10) Patent No.: US 8,109,442 B2
(45) Date of Patent: Feb. 7, 2012

(54) OPTICAL READER QUALITY FACTOR

(75) Inventor: Henry J. Constant, Jr., West Warwick, RI (US)

(73) Assignee: GTech Corporation, Providence, RI (US)

( * ) Notice: Subject to any disclaimer, the term of this patent is extended or adjusted under 35 U.S.C. 154(b) by 338 days.

(21) Appl. No.: 12/404,747

(22) Filed: Mar. 16, 2009

(65) Prior Publication Data

US 2010/0155480 A1      Jun. 24, 2010

Related U.S. Application Data

(63) Continuation-in-part of application No. 12/342,522, filed on Dec. 23, 2008.

(51) Int. Cl.
*G06K 7/10* (2006.01)

(52) U.S. Cl. .............................. 235/462.01; 235/462.06

(58) Field of Classification Search ............. 235/462.01, 235/462.04, 462.06, 462.14, 454
See application file for complete search history.

(56) References Cited

U.S. PATENT DOCUMENTS

| | | |
|---|---|---|
| 5,164,620 A | 11/1992 | Kalaf |
| 5,170,267 A | 12/1992 | Blitz |
| 5,734,479 A | 3/1998 | Huang |
| 5,912,724 A | 6/1999 | Sakaguchi |
| 6,535,649 B1 | 3/2003 | Chiu |
| 6,788,831 B1 | 9/2004 | Nabeshima |
| 7,000,828 B2 * | 2/2006 | Jones ............................ 235/379 |
| 7,182,249 B2 * | 2/2007 | Johannesson et al. ......... 235/375 |
| 7,451,913 B2 * | 11/2008 | Blair et al. ..................... 235/375 |
| 2007/0216747 A1 * | 9/2007 | Blair et al. ..................... 347/132 |

FOREIGN PATENT DOCUMENTS

| | | |
|---|---|---|
| EP | 0744862 A1 | 11/1996 |
| EP | 1667434 A1 | 6/2006 |
| JP | 06203147 A | 7/1994 |

* cited by examiner

*Primary Examiner* — Daniel St.Cyr
(74) *Attorney, Agent, or Firm* — Sullivan & Worcester LLP; Christopher T. McWhinney

(57) ABSTRACT

A method and apparatus for generating and applying quality factors (QFs) to an optical reader. After an optical reader is calibrated, a mid-range gray scale level is selected and scanned. The reader outputs digital numbers (DNs) that are generated for all the pixels that will be responding to the reading of a document. A histogram of the DNs is generated and characteristics of the histogram distribution are calculated and used as QFs. For example, the standard deviation of the histogram may serve as a QF, where a lower standard deviation is preferred. Thresholds and standards may be developed from experience that indicate the operating condition of the reader. The QFs, thus, may be used during manufacturing and for field servicing of the reader.

19 Claims, 3 Drawing Sheets

OPTICAL READER QUALITY FACTOR

RELATED APPLICATIONS

The present application is a continuation-in-part of, and claims priority from, U.S. patent application Ser. No. 12/342,522, which was filed on Dec. 23, 2008, and is entitled SYSTEM AND METHOD FOR CALIBRATING AN OPTICAL READER SYSTEM, and which application is of common inventorship and ownership, and which application is incorporated herein by reference.

BACKGROUND OF THE INVENTION

1. Field of the Invention

The present invention relates to manufacturing, field service, maintenance and performance aspects of optical readers and components thereof. More particularly, the present invention relates to quality factors that may be generated for such purposes.

2. Background Information

Optical readers are found in many systems, including scanners, copy machines, and document readers, such as, e.g., reader systems for processing markings in an image of a form, such as a lottery playslip. Lottery playslips include, e.g., cards, tickets, and other printed media that may identify a player's selection(s) in a lottery transaction. More particularly, playslips are used by a player to purchase a lottery ticket bearing a player's number selections. The markings on lottery playslips are processed to determine and verify the numbers selected by a player for an upcoming lottery drawing.

Optical reader systems typically include a motor assembly, an illumination source, a sensor array, and a computer processing system. The illumination source and sensor array may be part of a bar assembly that is positioned across the readable width of a document. The document and the bar assembly may move relative to each other to accomplish the scanning of the entire length of the document. In operation, the motor assembly may provide the relative motion so that each row across the width of the document may be scanned for the length of the entire document.

The illumination source may include a series of light emitting diodes (LEDs) and the sensor array may include a set of photo-transistors. Both the illumination source and the sensor array may be distributed along the bar assembly across the readable width of the document. The light from the LEDs is reflected from the document onto the sensors. Other illumination sources, e.g., flash tubes, fixed halogens, etc., may be used; and, other photo-sensors, e.g., photo-diodes, photo-resistors, etc., also may be used. In short, the present invention may find advantageous use with virtually any optical reader with any light source and with any sensor.

In this environment, each photo-sensor represents a pixel and the intensity of the reflected light corresponds to the scene on the document. When the document is illuminated, more light is reflected from light areas and less from dark areas; and the output level of a photo-sensor corresponds to the intensity of the light that is received by that pixel. The photo-sensors (pixels) are electronically scanned across the width of the document for each successive row along the length of the entire document. Illustratively, the height of each row may be determined by the motor assembly design, and the height may be equal to the width of a pixel.

Herein, the words and phrases "scanned," "read out", "sampled", and "clocked out" may be used interchangeably.

In the above description, the document may be driven across a stationary illumination bar, or the illumination bar may be driven across the document as the document remains in a stationary position such as, e.g., a document disposed on a platen.

In a calibrated reader, the relative outputs of the pixels over a gray scale dynamic range are balanced and output consistent values. That is, the outputs of all the pixels are substantially the same for the same scene, from the black area to the white area. In order to calibrate an optical reader, the light source, the photo-sensors and a gray scale target must be optimized to read the full black to white gray scale dynamic range. And, to be commercially competitive, it is important to measure and confirm the performance of a reader in the field.

Presently, components and sub-assemblies for optical readers are sample tested before they are incorporated into the optical reader and the reader is shipped to a customer. The reader itself is tested and calibrated by a quality assurance group that certifies its performance before shipping. Typically, once a reader is placed in the field, the manufacturer is only informed of a problem when a warranty issue or a service complaint is received. The reader may lose calibration due to, inter alia, a change in the characteristics of the light sources and/or the photo-sensitive devices. Typically, the response to a warranty issue or service complaint is a visit from a field service technician. And, between the time that the issue first arises or the complaint is made, and the time that the service to a reader is afforded, the reader is down. As a result, these service practices are slow, costly and customer unfriendly.

In view of the foregoing, it would be advantageous to generate a quality factor that indicates the performance of an optical reader during manufacturing and that can be tracked over time for optical readers in the field. It would be, moreover, advantageous if the quality factor was measurable on-line, while a reader is in service.

SUMMARY OF THE INVENTION

If an optical reader is calibrated to read a typical black to white gray scale, there will be a mid-level gray scene that lies somewhere between the black and the white areas. The present invention is directed to a system that generates a quality factor (QF) that indicates the performance quality of the optical reader when it is manufactured and that may be monitored and tracked over the lifetime time of reader in the field.

Illustratively, a QF may comprise a single numeric value. Experience with QF changes may be tracked over time for a significant number of readers and correlating problems with these readers may be developed to allow the maintenance of a reader or series of readers with little or no down time for the user. Experience also may help determine thresholds for QF changes that trigger preemptive maintenance of the readers.

Threshold is used herein as a value against which a measured QF is compared. Typically QF values that meet the threshold value are deemed to be acceptable units, and QF values that do not meet threshold are deemed to be unacceptable or questionable units that may need attention. Often measured QF values that are lower than the threshold are values that "meet" the threshold and values that are higher do not "meet" the threshold. But in other embodiments, thresholds may be defined inversely, where higher measured QF values "meet" the threshold and lower do not. Herein "meeting" a threshold is defined by context and may apply to both of the above uses.

In one embodiment, the present invention includes a target with a printed mid-range gray area that extends across to traverses the width of a document. The target may be the original target that is used during the final test of the reader before shipping. In other embodiments, the mid-range gray area may not be part of the same target, but may have the same optical responses for each pixel as did the original gray area on the original target. All the pixels are scanned and the optical output of each pixel is plotted as a histogram. The histogram represents the sums of the number of pixels that output a given response to the mid-range gray area. Histograms are defined broadly and may also be generated from locally averaged or filtered pixel outputs or from differentials of pixel values.

Each pixel's output may be an average over several rows of the gray area. The histogram distribution may be analyzed to provide a number of characteristics that may be used singly or in combination as a QF. Some of these characteristics may include, e.g., standard deviation, variance, the mean, the height of the mean, and a skewness factor. "Skewness" as known to those skilled in the art is a measure of the non-symmetry of what should be a "bell curve."

In another embodiment, the performance of a reader in the field is monitored by configuring a target with the mid-level gray area to be scanned by the reader. The reader may operate to scan most (or all) of the pixels that receive light reflected from the mid-level gray area. The response of each pixel may be measured and plotted into a histogram from which a QF may be calculated. The performance monitoring and tracking may be performed at regular intervals.

The QF thresholds, discussed above, that are tracked may be developed heuristically over time. Changes in the QFs may indicate that a maintenance visit may be needed shortly and can be scheduled. Alternatively, the changes may indicate that a reader may need to be replaced. In either case, the required service may be scheduled and performed before the reader fails in the field. The triggering thresholds may be particular for each reader, but an overall standard for QF changes applicable to a family of similar optical readers may be developed.

As mentioned above, a QF may be employed during final test of an optical reader, but it may also be used as a tool to inspect and accept sub-assemblies of an optical reader.

It will be appreciated by those skilled in the art that, although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The detailed description of the present invention, which is provided below, refers to the accompanying drawings, of which.

DETAILED DESCRIPTION OF AN ILLUSTRATIVE EMBODIMENT

Restating from above, an optical reader may be calibrated to read a typical black to white gray scale dynamic range, and a particular mid-level gray area may be selected for generating a quality factor (QF). The present invention provides a system and method for calculating a QF and approving an optical reader for shipment to a user. That QF may be calculated and tracked during the service life of the reader to monitor its performance and schedule service if the QF of the reader changes over a QF standard threshold. A QF standard may be developed, over time from experience for the reader or a reader family, wherein the standard includes a triggering threshold determined from experience. Exceeding a trigger threshold may prompt the need to schedule a service call for the reader, importantly before a field failure. The present invention also may apply regardless of how the optical reader is calibrated.

Briefly, calibrating an optical reader entails balancing the optical and electrical characteristics of the reader such that the digital output from each pixel is the same as for all the pixels subject to the same environment. That is, the light source, the sensors, the digital electronics and software all must be balanced and corrected to produce that same output when the same area of the target is being scanned.

Scanning the same area of the same or an optically equivalent target, typically a mid-level gray area, each time the reader is performance monitored, may indicate the potential for future maintenance issues. Future failures may be extrapolated and pre-emptive maintenance activities may be scheduled. The activities may include replacement of a sub-assembly or an entire unit where, in either event, such activities preempt the possibility of field failure.

In this case, the readings for each pixel may be repeated over a number of rows still within the mid-range gray area and the outputs averaged for each pixel. Then, a histogram distribution of the averaged pixel outputs may be plotted and analyzed. As mentioned above, in one embodiment, the standard deviation of the histogram distribution may be the QF.

Alternatively, a QF may be generated for each individual optical reader when shipped from the manufacturer. The QF is retained and when that optical reader is in the field, the QF may be generated, e.g., on-line via the Internet, where a target may be scanned by the optical reader and the QF may be generated at a distal facility.

Figure 1:
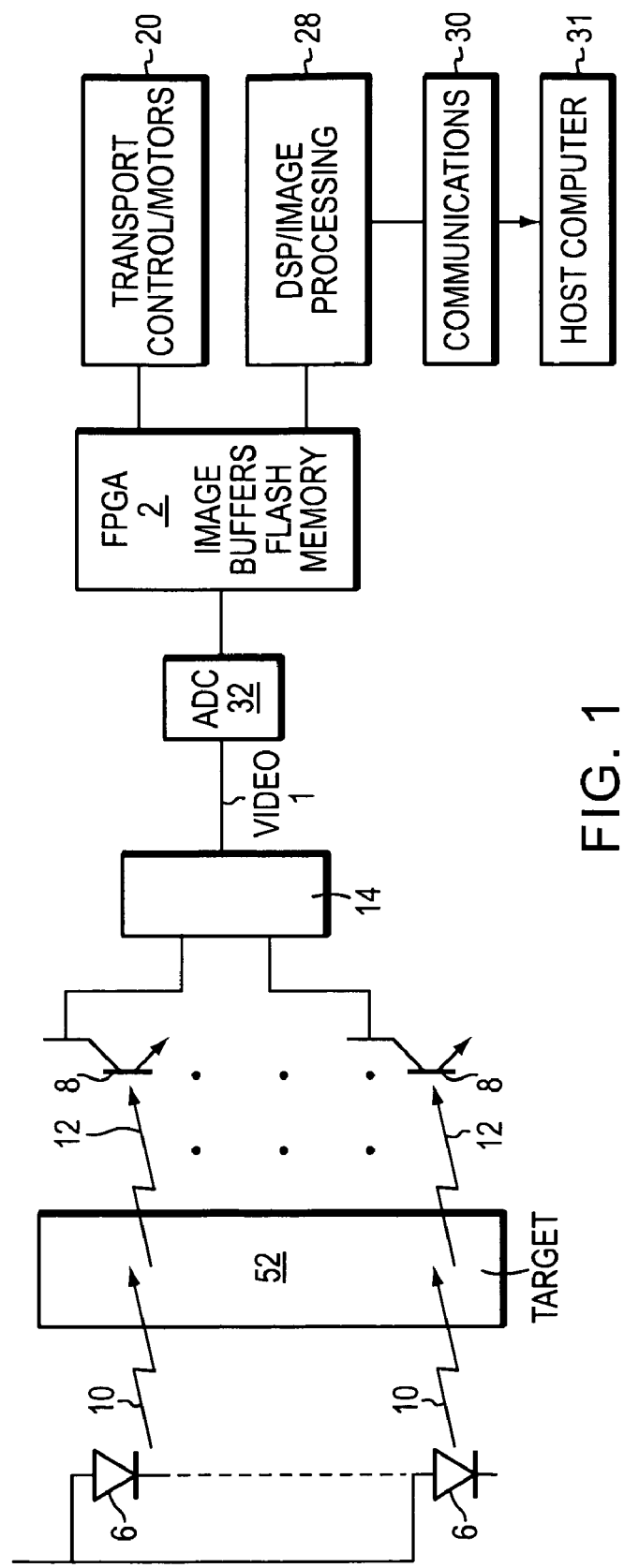
FIG. 1 is a system block diagram of an optical reader.

FIG. 1 illustrates one embodiment of an optical reader that is briefly discussed, since, as mentioned above, how an optical reader is calibrated is exclusive of the present invention.

The optical reader includes LED lights sources are driven with a current LED sink that is disposed near the middle of the LEDs linear range of light output. A target 52 receives an LED light 10 output and reflects that light 12 to photo-transistors 8. A video channel selector 14 feeds the video to an analog to digital converter (ADC) 32. The digital output from the ADC 32 is input to a processor; here, a field programmable gate array, FPGA 2. The FPLA 2 controls the scanning of the target 49 and the storing of the digital output from the ADC 32.

The digital output from the ADC 32 is typically a binary number, often of eight bits, and is referenced herein as a DN, as used below.

There is an image processor, here a digital signal processor, DSP 28, that processes DNs of the image. The result of that processing may be communicated via a communications interface 30, such as, e.g., a USB, to a distal host computer 31.

As may be found in typical computing systems, flash memory, and motor control and motors 20 may be included.

Once the optical reader system is calibrated, a reading may be taken of a mid-range gray area from all the pixels needed to scan an entire document. Referring to FIG. 1, light 10 is reflected 12 from locations that extend across the width of the document. Each photo-transistor 8 defines a pixel location.

Figure 2:
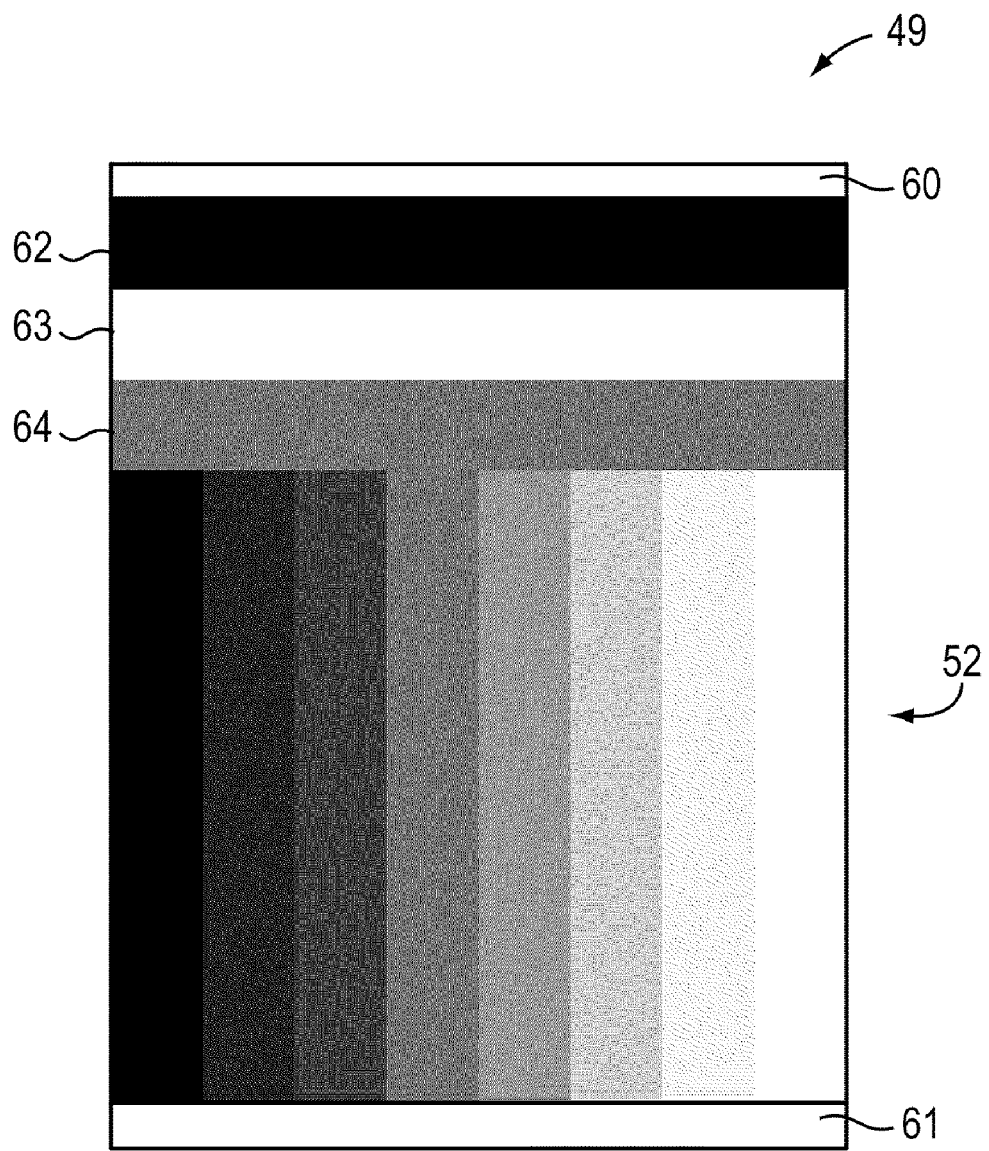
FIG. 2 illustrates of one embodiment of an optical target.

FIG. 2 illustrates a target 49 having an optical pattern that may be used in accord with the present invention. The target 49 may include at least one vertical column 52, or a number of columns 52. In embodiments where the target 49 includes more than one vertical column 52, each column may represent a different gray scale value. In the embodiment shown in FIG. 2, the target includes eight vertical columns 52, where the left-most column is black in color, the right-most column is white in color, and the columns therebetween are of varied gray scale values.

The target 49 may include two narrow horizontal white stripes 60, 61, which are dimensioned to be about (height× width) 8.8 mm×218 mm, and may provide a distinctive buffer to easily identify the target edges. The target 49 may have known dimensions that may permit the reader software to "know" the location of the patterns on the target 49. The target may be 1728 pixels wide and the buffers 60, 61 may each be 70 lines high. Each row or horizontal line 60, 61 of the target 49 may have the same height as a pixel is wide.

The target further may include three horizontal bars across the top of the target; one black 62, one white 63, and one gray 64, wherein each bar is dimensioned to be about (height× width) 27.3 mm×218 mm. In accord with this embodiment, each bar may extend across the full width of the target 49, or may be dimensioned such that it is 1728 pixels wide and 216 lines high.

The entire target, in this embodiment, is about 297 mm height and 218 mm wide, a little larger than the size of an A4 sheet of paper. Other sizes also may be used.

The gray scale area 64 of FIG. 2 is designed as a mid-level gray area for generating a QF.

Quality Factor, of, Check for Readers

As illustrated FIG. 2, bar 64 is a gray scale area that extends across the width of the target 49. All the pixels across bar 64 may be scanned and DNs may be generated. The DNs for each pixel may be averaged over several or many rows and stored. A histogram distribution of the stored DNs may then be generated and analyzed. The resulting mean, standard deviation, variance, and other (e.g. skewness) factors may be calculated from the distribution, stored and designated as the QF for this reader.

In some applications, as mentioned above, more than one characteristic may be used as a QF to monitor performance.

Later, when a reader is in the field, the same target 49 may be placed in the reader and scanned at intervals over the lifetime of the reader. A remote host computer 31 may command the reader to scan the mid-level gray scale bar of the target 49 via the Internet (or the local user may do so) whereupon the reader will regenerate a histogram comparable to the histogram that was generated at the final test for the reader. A QF may be calculated from the regenerated histogram and compared to the original QF. Any differences between the final test QF and the field generated QF may be used to judge the performance status of the reader in the field. Thresholds may be derived for the QF difference values, as mentioned above, from operating many readers over extended time periods, or they may be calculated by inferring changes in readers as they age. The thresholds may indicate that immediate service or recalibration is necessary, or that the reader is fully operational.

Figure 3:
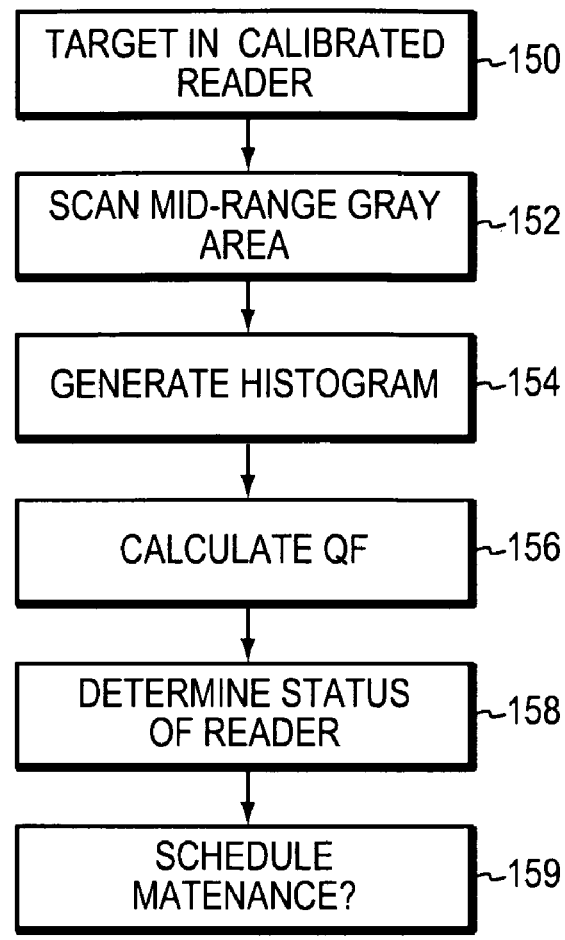
FIG. 3 is a flow chart illustrating an exemplary process for generating a QF according to the present invention.

FIG. 3 illustrates a process for generating a first quality factor (QF). In a first step of this process, 150, a printed target 49 is arranged and positioned in an already calibrated reader. The reader is commanded to scan mid-range level gray area pattern 152. Several rows may be scanned and the pixel outputs, DNs, are averaged.

At step 154, a histogram is generated from the averaged and scanned pixel outputs. In step, 156, the QF may be calculated from the distribution. Any difference in the QF from the first and/or the last QF generated is compared to QF thresholds QF and, at step 158, the performance status of the reader determined. In one example, QF thresholds may have been developed that indicate that a reader is operating satisfactorily where the threshold has not been exceeded. For example one threshold may apply to the first QF measured that allows the reader to be shipped. Later, thresholds may be applied to readers in the field, where history indicates a reader is operating satisfactorily, or that routine servicing, part replacement, or reader replacement will be required at some point in the future.

The QF history of particular readers and the performance issues of these readers may be correlated to develop QF thresholds that may be used to evaluate performance and maintenance issues in the field.

Figure 4:
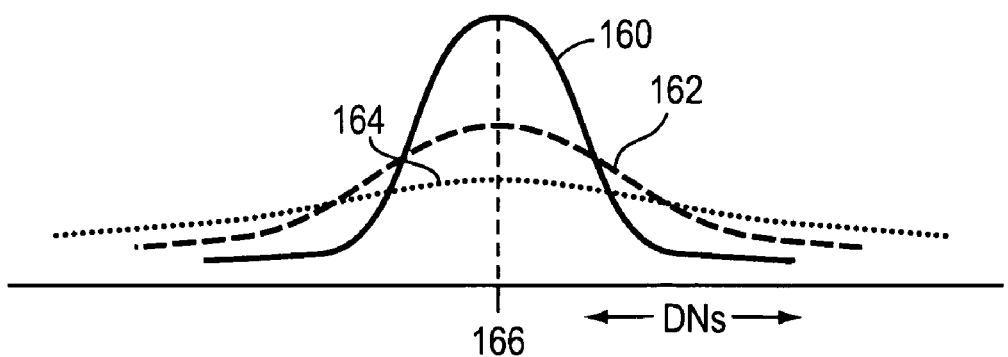
FIG. 4 is a chart of traces of exemplary histograms.

FIG. 4 illustrates some possible distributions that may occur during the process of generating a QF. For illustrative purposes all the distributions share the same mean 166, but in practice the means may differ. A narrow distribution 160 will yield the smallest standard deviation, and a threshold based on the standard deviation may be established heuristically that indicates satisfactory performance. Other distributions with significantly larger standard deviations, e.g., 162 and 164, illustrate units that may exceed the threshold and indicate deteriorating performance. The distribution 162 may indicate acceptable performance, but that a service visit is needed; while the distribution 164 may indicate a failed reader.

In addition, repaired and refurbished readers may use the QF as a final quality check, and field service diagnostics may benefit from the QF. Since the QF may be a single number that is quickly generated, it may be run daily or on at an appropriately scheduled interval;, and it may be sent to a manufacturer's service department automatically via the Internet. Such activity may enable automatic checking of the entire installed base of reader throughout the world, and would allow preemptive maintenance to minimize use down time in the field.

These embodiments are being presented herein as examples and that many variations and alternatives thereof are possible. Accordingly, the present invention should be viewed broadly as being defined only as set forth in the hereinafter appended claims.

What is claimed is:

1. A method for determining a performance status for an optical reader, the method comprising the steps of:
   placing a target in the reader, the target having a mid-range gray scale area that extends across a width of a document to be read;
   selecting the mid-range gray scale area to be read;
   illuminating and scanning pixels traversing the mid-range gray scale area;
   accumulating the pixel outputs;
   forming a histogram based upon the accumulated pixel outputs;
   measuring one or more characteristics of the histogram;
   forming a quality factor based on the measured one or more characteristics of the histogram; and
   comparing the quality factor to a threshold to determine a performance status for the reader.

2. The method of claim 1, wherein the measured one or more characteristics is selected from the group of histogram characteristics consisting of standard deviation, variance, the mean, the number of pixels at the mean, and a skewness of the distribution.

3. The method of claim 1 further comprising the steps of:
   predetermining the threshold; and, approving shipping or continued use of the optical reader provided that the quality factor at least meets the threshold.

4. The method of claim 1 further comprising the steps of:
measuring the quality factor of readers in the field;
tracking changes in the quality factor of the readers in the field; and
heuristically developing maintenance schedules for readers in the field, wherein the maintenance schedule is a function of the changes tracked.

5. The method of claim 1 further comprising the step of:
illuminating and scanning a series of horizontal rows of the target; and
averaging the accumulated pixel outputs over the series of horizontal rows.

6. The method of claim 1 further comprising the step of servicing the reader.

7. The method of claim 1 further comprising the steps of:
performing the steps of claim 1 repeatedly over time,
tracking the changes in quality factor as the steps of claim 1 are repeated; and
developing a service schedule from the tracked changes in quality factor.

8. The method of claim 7, wherein the method of claim 7 is repeated for many optical readers in the field.

9. The method of claim 8 further comprising the steps of:
determining if a reader requires service based upon the comparison of the quality factor to the threshold.

10. The method of claim 1 further comprising initiating the method of claim 1 from a remote host.

11. The method of claim 1 further comprising the step of extending the mid-range gray scale area to traverse the entire width of the document to be read.

12. The method of claim 1 wherein the quality factor is applied to a manufacturing function of accepting or rejecting subassemblies of an optical reader.

13. The method of claim 1 wherein the quality factor is determined based on two or more characteristics of the histogram.

14. An apparatus for determining a performance status for an optical reader, the apparatus comprising:
a target for placement in an optical reader, the target having a mid-range gray area that extends across a width of a document to be read;
a light for illuminating the mid-range gray scale area;
photo-sensors for receiving light reflected from the mid-range gray area and generating a video signal output;
at least one analog to digital converter for accepting the video signal output and producing a digital number;
a processor for accumulating the digital number and forming a histogram based upon the accumulated digital number;
a calculator configured to calculate at least one characteristic of the histogram, wherein the at least one calculated characteristic of the histogram is used to form a quality factor; and
a comparator configured to compare the quality factor to a threshold to determine a performance status for the reader.

15. The apparatus of claim 14, wherein the at least one characteristic of the histogram is selected from the group of characteristics consisting of: standard deviation, variance, the mean, a number of pixels at the mean, and a skewness of the distribution.

16. The apparatus of claim 14 further comprising:
an approval for shipping or continued use of the optical reader provided that the quality factor at least meets the threshold, wherein the threshold is predetermined.

17. The apparatus of claim 14 wherein the mid-range gray scale area traverses the entire width of the document to be read.

18. The apparatus of claim 14 further comprising a manufacturing site wherein the quality factor is applied to the accepting or rejecting of subassemblies of an optical reader.

19. The apparatus of claim 14 wherein the quality factor is determined based on two or more characteristics of the histogram.

* * * * *